United States Patent
Zhang (10) Patent No.: US 11,172,040 B2
(45) Date of Patent: Nov. 9, 2021

(54) METHOD AND APPARATUS FOR PUSHING INFORMATION

(71) Applicant: Baidu Online Network Technology (Beijing) Co., Ltd., Beijing (CN)

(72) Inventor: Feng Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 76 days.

(21) Appl. No.: 16/433,290

(22) Filed: Jun. 6, 2019

(65) Prior Publication Data

US 2020/0045122 A1 Feb. 6, 2020

(30) Foreign Application Priority Data

Aug. 6, 2018 (CN) .......................... 201810887222.8

(51) Int. Cl.
H04L 29/08 (2006.01)
(52) U.S. Cl.
CPC .............. H04L 67/26 (2013.01); H04L 67/02 (2013.01)
(58) Field of Classification Search
CPC ................................ H04L 67/26; H04L 67/02
USPC .................................................. 709/206, 217
See application file for complete search history.

(56) References Cited

U.S. PATENT DOCUMENTS

| | | | | |
|---|---|---|---|---|
| 6,691,106 B1* | 2/2004 | Sathyanarayan | ... | G06F 16/9535 |
| 7,783,622 B1* | 8/2010 | Vandermolen | ........ | G06F 16/951 |
| | | | | 707/708 |
| 8,762,392 B1* | 6/2014 | Yamauchi | ........... | G06F 16/3325 |
| | | | | 707/749 |
| 9,201,868 B1* | 12/2015 | Zhang | ...................... | G06F 40/30 |
| 9,310,879 B2* | 4/2016 | Jacques, Jr. | ......... | G06F 16/9535 |
| 9,336,321 B1* | 5/2016 | Hayden | ............... | G06F 16/9535 |
| 2002/0107735 A1* | 8/2002 | Henkin | .............. | G06Q 30/0255 |
| | | | | 705/14.55 |
| 2006/0048046 A1* | 3/2006 | Joshi | ..................... | G06F 40/169 |
| | | | | 715/230 |
| 2006/0259462 A1* | 11/2006 | Timmons | .......... | G06F 16/90335 |
| 2007/0061410 A1* | 3/2007 | Alperin | ................. | G06F 16/957 |
| | | | | 709/217 |
| 2007/0239682 A1* | 10/2007 | Arellanes | .............. | G06F 16/951 |
| 2008/0022216 A1* | 1/2008 | Duval | ................. | G06F 16/3323 |
| | | | | 715/762 |
| 2009/0089246 A1* | 4/2009 | Chi | ....................... | G06F 16/951 |
| 2009/0100021 A1* | 4/2009 | Morris | .................. | G06F 16/955 |

(Continued)

FOREIGN PATENT DOCUMENTS

| | | |
|---|---|---|
| CN | 107766328 A | 3/2018 |
| CN | 107908789 A | 4/2018 |

*Primary Examiner* — Madhu Woolcock
(74) *Attorney, Agent, or Firm* — Knobbe Martens Olson & Bear LLP (57) ABSTRACT

Embodiments of the present disclosure disclose a method and apparatus for pushing information. A specific embodiment of the method includes: acquiring, in response to a user selecting historical search data, a webpage content corresponding to the historical search data; dividing the webpage content into at least one webpage content segment, and extracting a topic of the at least one webpage content segment; and pushing information to the user based on the topic of the at least one webpage content segment. This embodiment can quickly push core information of a webpage to the user when the user browses the webpage again.

12 Claims, 4 Drawing Sheets

| Search terms you have input: | Topics of webpages you have browsed: |
|---|---|
| What brand of crib is good | Top Ten Brand Rankings for Cribs |
| | What brand of crib is good |
| How about the xx brand of crib | How about the xx brand of crib |
| | The price of the xx brand of crib |

(56) References Cited

U.S. PATENT DOCUMENTS

| | | | |
|---|---|---|---|
| 2010/0131485 A1* | 5/2010 | Hu | G06F 16/957 |
| | | | 707/706 |
| 2011/0093488 A1* | 4/2011 | Amacker | G06F 16/3323 |
| | | | 707/767 |
| 2011/0161070 A1* | 6/2011 | Chen | G06F 40/30 |
| | | | 704/9 |
| 2011/0191344 A1* | 8/2011 | Jin | G06F 16/00 |
| | | | 707/739 |
| 2014/0195977 A1* | 7/2014 | Chang | G06F 16/24578 |
| | | | 715/833 |
| 2015/0331240 A1* | 11/2015 | Poulos | G06T 19/006 |
| | | | 345/8 |
| 2016/0012104 A1* | 1/2016 | Petrov | G06F 16/951 |
| | | | 707/706 |
| 2016/0283055 A1* | 9/2016 | Haghighat | G06F 3/04883 |
| 2016/0364757 A1* | 12/2016 | Zhang | G06F 16/24578 |
| 2017/0193118 A1* | 7/2017 | Pratt | G06F 16/2428 |
| 2018/0189614 A1* | 7/2018 | Chen | G06F 40/14 |
| 2018/0246983 A1* | 8/2018 | Rathod | G06F 16/9535 |
| 2019/0005121 A1 | 1/2019 | Chi et al. | |
| 2020/0004884 A1* | 1/2020 | Gibson | G06F 16/9535 |

\* cited by examiner

| Search terms you have input: | Topics of webpages you have browsed: |
|---|---|
| What brand of crib is good | Top Ten Brand Rankings for Cribs |
| | What brand of crib is good |
| How about the xx brand of crib | How about the xx brand of crib |
| | The price of the xx brand of crib |

METHOD AND APPARATUS FOR PUSHING INFORMATION

CROSS-REFERENCE TO RELATED APPLICATIONS

This application claims priority to Chinese Patent Application No. 201810887222.8, filed on Aug. 6, 2018, titled "Method and Apparatus for Pushing Information," which is hereby incorporated by reference in its entirety.

TECHNICAL FIELD

Embodiments of the present disclosure relate to the field of computer technology, specifically to a method and apparatus for pushing information.

BACKGROUND

Searching allows users to access vast amounts of knowledge while making selection difficult. Sometimes after the users browse a lot of webpages, they find that they have forgotten the contents of the webpages previously browsed. If they want to view the pages again, they need to click on the previously browsed webpages to read anew.

The existing searching process generally includes the following steps: first, the user inputs a search term to initiate a search request; next, topics of webpages associated with the search term are displayed; then, the user clicks on a topic of a webpage to jump to display the webpage for the user to browse the content of the webpage; and finally, the user finishes browsing and closes the webpage. If the user wants to view the content of the previously browsed webpage again, it is usually necessary to click on the topic of the webpage in the history browsing record, or input the search term again to initiate searching, and click on the displayed topic of the webpage to jump to display the webpage for the user to read the content of the webpage again.

SUMMARY

Embodiments of the present disclosure provide a method and apparatus for pushing information.

In a first aspect, the embodiments of the present disclosure provide a method for pushing information, including: acquiring, in response to a user selecting historical search data, a webpage content corresponding to the historical search data; dividing the webpage content into at least one webpage content segment, and extracting a topic of the at least one webpage content segment; and pushing information to the user based on the topic of the at least one webpage content segment.

In some embodiments, the extracting a topic of the at least one webpage content segment includes: inputting, for a webpage content segment in the at least one webpage content segment, the webpage content segment into a pre-trained document topic generation model to obtain the topic of the webpage content segment.

In some embodiments, the pushing information to the user based on the topic of the at least one webpage content segment includes: pushing the topic of the at least one webpage content segment to the user.

In some embodiments, the pushing information to the user based on the topic of the at least one webpage content segment includes: matching, for a webpage content segment in the at least one webpage content segment, a text in the webpage content segment with the topic of the webpage content segment to acquire a matched text, setting a preset text effect on the matched text, and generating a webpage with the set text effect; and pushing the webpage with the set text effect to the user.

In some embodiments, the pushing information to the user based on the topic of the at least one webpage content segment includes: performing word segmentation on the topic of the at least one webpage content segment, and generating a word vector corresponding to the webpage content based on a word segmentation result; inputting the word vector corresponding to the webpage content to a pre-trained intent prediction model to obtain a search intent corresponding to the webpage content, where the intent prediction model is used to predict a search intent; extracting an interest tag set from a user portrait of the user; matching the search intent corresponding to the webpage content with an interest tag in the interest tag set to acquire a matched interest tag; matching a text in the webpage content with the matched interest tag to acquire a matched text, setting a preset text effect on the matched text, and generating a webpage with the set text effect; and pushing the webpage with the set text effect to the user.

In some embodiments, the intent prediction model is obtained by training, the training including: acquiring a training sample set, where a training sample includes sample search data and a sample search intent corresponding to the sample search data; and training a multi-layer neural network to obtain the intent prediction model based on the training sample set.

In a second aspect, the embodiments of the present disclosure provide an apparatus for pushing information, including: an acquisition unit, configured to acquire, in response to a user selecting historical search data, a webpage content corresponding to the historical search data; an extraction unit, configured to divide the webpage content into at least one webpage content segment, and extract a topic of the at least one webpage content segment; and a pushing unit, configured to push information to the user based on the topic of the at least one webpage content segment.

In some embodiments, the extraction unit is further configured to: input, for a webpage content segment in the at least one webpage content segment, the webpage content segment into a pre-trained document topic generation model to obtain the topic of the webpage content segment.

In some embodiments, the pushing unit includes: a first pushing subunit, configured to push the topic of the at least one webpage content segment to the user.

In some embodiments, the pushing unit includes: a first generation subunit, configured to match, for a webpage content segment in the at least one webpage content segment, a text in the webpage content segment with the topic of the webpage content segment to acquire a matched text, set a preset text effect on the matched text, and generate a webpage with the set text effect; and a second pushing subunit, configured to push the webpage with the set text effect to the user.

In some embodiments, the pushing unit includes: a word segmentation subunit, configured to perform word segmentation on the topic of the at least one webpage content segment, and generate a word vector corresponding to the webpage content based on a word segmentation result; a prediction subunit, configured to input the word vector corresponding to the webpage content to a pre-trained intent prediction model to obtain a search intent corresponding to the webpage content, where the intent prediction model is used to predict a search intent; an extraction subunit, configured to extract an interest tag set from a user portrait of the user; a matching subunit, configured to match the search intent corresponding to the webpage content with an interest tag in the interest tag set to acquire a matched interest tag; a second generation subunit, configured to match a text in the webpage content with the matched interest tag to acquire a matched text, set a preset text effect on the matched text, and generate a webpage with the set text effect; and a third pushing subunit, configured to push the webpage with the set text effect to the user.

In some embodiments, the intent prediction model is obtained by training, the training including: acquiring a training sample set, where a training sample includes sample search data and a sample search intent corresponding to the sample search data; and training a multi-layer neural network to obtain the intent prediction model based on the training sample set.

In a third aspect, the embodiments of the present disclosure provide a server, including: one or more processors; a storage apparatus, storing one or more programs thereon; and the one or more programs, when executed by the one or more processors, cause the one or more processors to implement the method according to any one of the implementations in the first aspect.

In a fourth aspect, the embodiments of the present disclosure provide a computer readable medium, storing a computer program thereon, the program, when executed by a processor, implements the method according to any one of the implementations in the first aspect.

The method and apparatus for pushing information provided by the embodiments of the present disclosure acquire, in response to a user selecting historical search data, a webpage content corresponding to the historical search data, then divide the webpage content into at least one webpage content segment, and extract a topic of the at least one webpage content segment, and finally push information to the user based on the topic of the at least one webpage content segment. The method and apparatus can quickly push core information of a webpage to the user when the user browses the webpage again.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
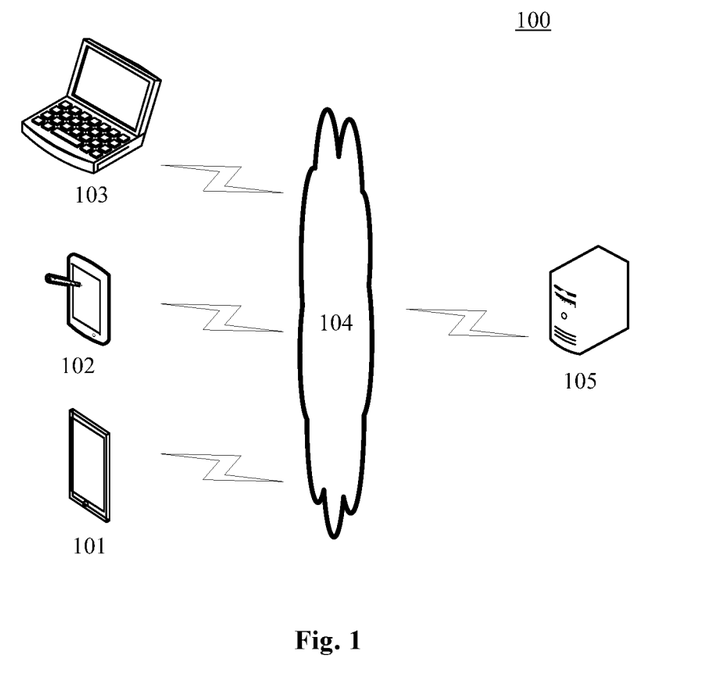
FIG. 1 is an exemplary system architecture to which the present disclosure may be applied.

FIG. 1 illustrates an exemplary system architecture 100 to which a method for pushing information or an apparatus for pushing information according to some embodiments of the present disclosure may be applied.

As shown in FIG. 1, the system architecture 100 may include terminal devices 101, 102, 103, a network 104, and a server 105. The network 104 is configured to provide a communication link medium between the terminal devices 101, 102, 103 and the server 105. The network 104 may include various types of connections, such as wired, wireless communication links, or optical fibers, and the like.

A user may interact with the server 105 via the network 104 using the terminal devices 101, 102, 103, to receive or transmit messages and the like. Various client applications, such as a webpage browser application, may be installed on the terminal devices 101, 102, and 103.

The terminal devices 101, 102 and 103 may be hardware or software. When being hardware, the terminal devices 101, 102 and 103 may be various electronic devices having display screens and supporting webpage browsing, including but not limited to smart phones, tablets, laptop portable computers, desktop computers, etc. When being software, the terminal devices 101, 102 and 103 may be installed in the above-listed electronic devices. The terminal devices 101, 102 and 103 may be implemented as a plurality of software or software modules, or as a single software or software module, which is not specifically limited here.

The server 105 may be a server that provides various services. For example, the server 105 may analyze data such as historical search data acquired from the terminal devices 101, 102, and 103, and feed back processing results (for example, push information) to the terminal devices 101 and 102. 103.

It should be noted that the server 105 may be hardware or software. When the server 105 is hardware, the server may be implemented as a distributed server cluster composed of multiple servers, or as a single server. When the server 105 is software, the server may be implemented as a plurality of software or software modules (for example, for providing distributed services), or as a single software or software module, which is not specifically limited here.

It should be noted that the method for pushing information according to the embodiments of the present disclosure is generally executed by the server 105. Accordingly, the apparatus for pushing information is generally provided in the server 105.

It should be appreciated that the numbers of the terminal devices, the networks and the servers in FIG. 1 are merely illustrative. Any number of terminal devices, networks and servers may be provided based on the implementation requirements.

Figure 2:
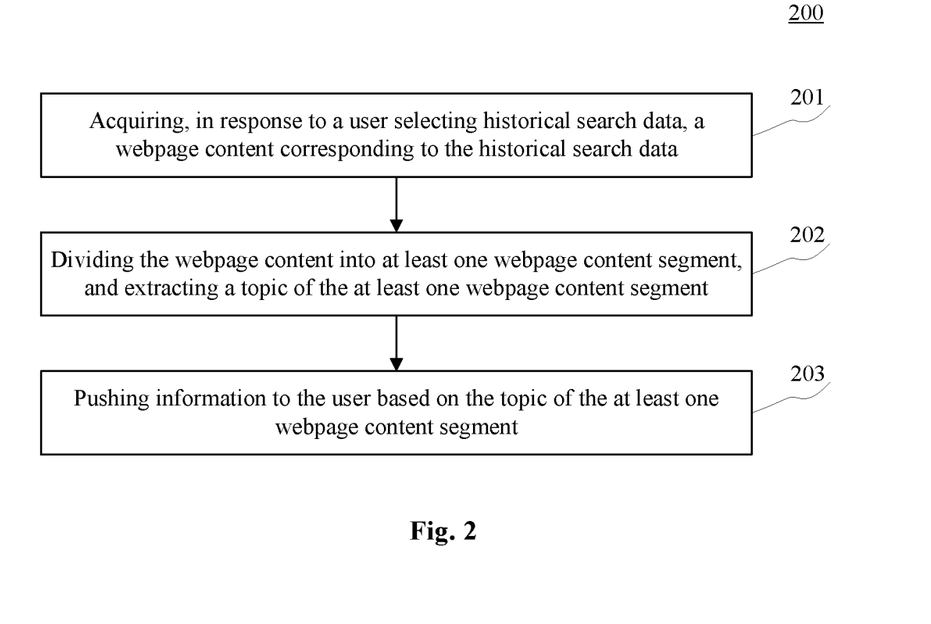
FIG. 2 is a flowchart of an embodiment of a method for pushing information according to the present disclosure.

With further reference to FIG. 2, a flow 200 of an embodiment of a method for pushing information according to the present disclosure is illustrated. The method for pushing information includes the following steps 201 to 203.

Step 201 includes acquiring, in response to a user selecting historical search data, a webpage content corresponding to the historical search data.

In the present embodiment, when the user selects historical search data, an executing body (for example, the server 105 as shown in FIG. 1) of the method for pushing information may acquire the webpage content corresponding to the historical search data. The historical search data may include a search term previously input by the user and a topic of the webpage that the user has previously browsed.

In practice, when the user needs to browse a webpage, a web browser application installed on the terminal device (for example, the terminal devices 101, 102, 103 shown in FIG. 1) may be runned, and a search term is input in the search box of the web browser application. After that, the user clicks the search button in the web browser application to initiate a search request to the above-mentioned executing body. When t the search request is received, the executing body may use the search term input by the user to search in a search engine to acquire a webpage set associated with the search term, and send a topic set corresponding to the webpage set associated with the search term to the user for display on the terminal device of the user. When the user clicks on a topic in the topic set, a browsing request may be initiated to the executing body. When the executing body receives the browsing request, the webpage corresponding to the topic clicked by the user may be acquired from the webpage set associated with the search term, and sent to the user for browsing. Therefore, in the search process, the executing body may acquire not only the search term input by the user but also the topic of the webpage browsed by the user. In this way, the executing body may aggregate a historical search data set based on the search terms input by the user and the topics of the webpages browsed within a preset time period (for example, within the last hour). A piece of historical search data in the historical search data set may include a search term input by the user and a webpage browsed by the user.

Figure 3:
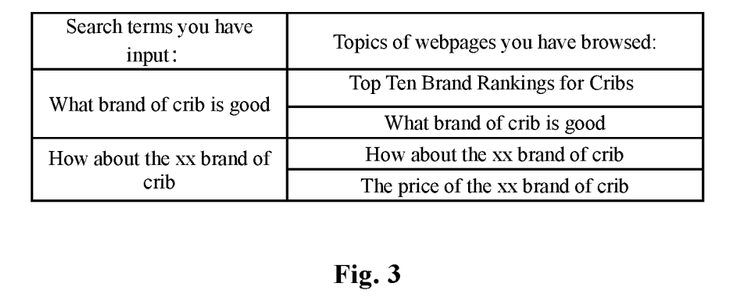
FIG. 3 is a schematic diagram of a historical search data set.

For example, in the last hour, if the user inputs the search term "What brand of crib is better" in the web browser application and browses the webpages with the topics "Top Ten Brand Rankings for Cribs" and "What brand of crib is better", and inputs the search term "How about the xx brand of crib", and browses the webpages with the topics "How about the xx brand of crib" and "The price of the xx brand of crib", then the executing body aggregates the historical search data set as shown in FIG. 3. A "Current Focus" button may be set in the web browser application. When the user needs to browse these pages again, he/she may click the "Current Focus" button, such that the executing body may send the historical search data set to the terminal device of the user for display. The topic of a webpage in the historical search data set may be associated with the URL of the webpage. When the user directly clicks on the topic of a certain webpage in the historical search data set, the interface may directly jump to display the webpage for the user to browse the content of the webpage again. An "add for comparison" button may be set in the vicinity (for example, behind the topic of the webpage) of the topic of each webpage in the historical search data set, and when the user clicks on the "add for comparison" button in the vicinity of the topic of a webpage, the topic of the web page is selected. A "start comparison" button may be set in the vicinity of the historical search data set (for example, behind the historical search data set). When the user clicks on the "start comparison" button, the topic of the webpage selected by the user may be sent to the executing body. For example, the user clicks on the " add for comparison" buttons in the vicinities of the topics "Top Ten Brand Rankings for Cribs" and "How about the xx brand of crib" and clicks on the "start comparison" button. Then, the executing body may find out the corresponding webpages according to the topics "Top Ten Brand Rankings for Cribs" and "How about the xx brand of crib", and acquire the contents of the webpages.

Step 202 includes dividing the webpage content into at least one webpage content segment, and extracting a topic of the at least one webpage content segment.

In the present embodiment, the executing body may divide the webpage content into at least one webpage content segment. For each of the at least one webpage content segment, the executing body may extract the topic of the webpage content segment. For example, if the webpage content includes N (N is a positive integer) paragraphs, the executing body may divide the webpage content into N webpage content segments. Here, a webpage content segment corresponds to a paragraph of the webpage content. For another example, the executing body may randomly divide the webpage content into a plurality of webpage content segments. The number of the divided webpage content segments may be a default setting, or autonomously set by the user as needed.

In some alternative implementations of the present embodiment, for a webpage content segment in the at least one webpage content segment, the executing body may input the webpage content segment into a pre-trained document topic generation model to obtain the topic of the webpage content segment. The document topic generation model may be used to generate a probability distribution of the topic of the document. Specifically, for each webpage content segment in the at least one webpage content segment, the executing body may input the webpage content segment into the document topic generation model, and output a probability distribution of topics of the webpage content segment. According to the probability distribution of the topics of the webpage content segment, the topic of the webpage content segment may be obtained. The number of the topics of the webpage content segment may be an integer greater than or equal to zero, that is, the webpage content segment may have no topic, only one topic or multiple topics.

As an example, the document topic generation model may be LDA (Latent Dirichlet Allocation). Here, LDA is also referred to as three-layer Bayesian probability model, including a three-layer structure of words, topics and documents. LDA is an unsupervised machine learning technology that may be used to identify hidden topics in a large document collection or corpus. LDA uses a bag of words approach that treats each document as a word frequency vector, thereby transforming text information into digital information that is easy to model. Each document represents a probability distribution of topics, and each topic represents a probability distribution of many words.

Step 203 includes pushing information to the user based on the topic of the at least one webpage content segment.

In the present embodiment, the executing body may push information to the user based on the topic of the at least one webpage content segment. For example, the executing body may push the topic of the at least one webpage content segment to the user. For another example, the executing body may edit the webpage content based on the topic of the at least one webpage content segment to generate a new webpage, and push the new webpage to the user.

It should be noted that when the user needs to re-browse a plurality of webpages, a plurality of pieces of historical search data may be selected. For each of the plurality of pieces of historical search data, steps 201-203 are performed. In this way, the user may receive a plurality of pieces of push information corresponding to the plurality of pieces of historical search data. Thus, the user may compare the core content of the plurality of webpages based on the plurality of pieces of push information.

In the method for pushing information according to the embodiments of the present disclosure, in response to a user selecting historical search data, a webpage content corresponding to the historical search data is acquired, then the webpage content is divided into at least one webpage content segment, and a topic of the at least one webpage content segment is extracted, and finally information is pushed to the user based on the topic of the at least one webpage content segment. When the user browses the historical webpage again, the core information of the webpage is quickly pushed to the user.

Figure 4:
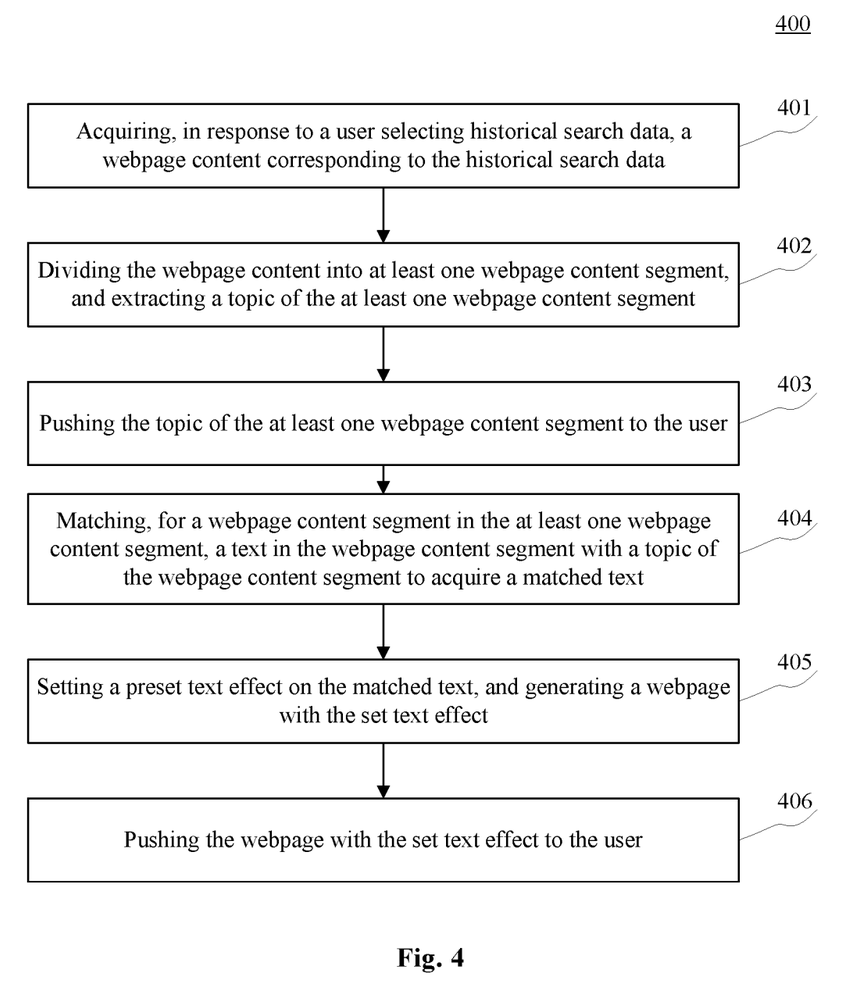
FIG. 4 is a flowchart of another embodiment of the method for pushing information according to the present disclosure.

With further reference to FIG. 4, a flow 400 of another embodiment of the method for pushing information according to the present disclosure is illustrated. The method for pushing information includes the following steps 401 to 406.

Step 401 includes acquiring, in response to a user selecting historical search data, a webpage content corresponding to the historical search data.

Step 402, dividing the webpage content into at least one webpage content segment, and extracting a topic of the at least one webpage content segment.

In the present embodiment, the specific operations of steps 401-402 are substantially the same as the operations of steps 201-202 in the embodiment shown in FIG. 2, and detailed description thereof will be omitted.

Step 403 includes pushing the topic of the at least one webpage content segment to the user.

In the present embodiment, an executing body of the method for pushing information (for example, the server 105 as shown in FIG. 1) may push the topic of the at least one webpage content segment to the user for display on the user's terminal device (e.g., the terminal devices 101, 102, 103 shown in FIG. 1).

Step 404 includes matching, for a webpage content segment in the at least one webpage content segment, a text in the webpage content segment with the topic of the webpage content segment to acquire a matched text.

In the present embodiment, for the webpage content segment in the at least one webpage content segment, the executing body may match the text in the webpage content segment with the topic of the webpage content segment to acquire the matched text. For example, the executing body may calculate the similarity between each sentence in the webpage content segment and the topic of the webpage content segment. If the similarity is greater than a preset similarity threshold, the text in the sentence is used as the matched text. Here, for each sentence in the webpage content segment, the executing body may perform word segmentation on the sentence to generate a keyword set of the sentence. Similarly, the executing body may perform word segmentation on the topic of the webpage content segment to generate a keyword set of the topic of the webpage content segment. Then, the executing body may calculate the similarity between the keyword set of the sentence and the keyword set of the topic of the webpage content segment. For example, the ratio of the number of the keywords in the keyword set of the sentence having identical keywords in the keyword set of the topic of the webpage content segment to the number of keywords in the keyword set of the sentence may be used as the similarity between the sentence and the topic of the webpage content segment.

Step 405 includes setting a preset text effect on the matched text, and generating a webpage with the set text effect.

In the present embodiment, the executing body may set the preset text effect on the matched text, and generate the webpage with the set text effect. Here, setting a text effect on the matched text may distinguish the matched text from the unmatched text, so that the user may quickly acquire the matched text when browsing the webpage. For example, the color of the matched text may be set to yellow, so that when the user browses the webpage with the set text effect, the user may notice the set yellow text in the first place.

Step 406 includes pushing the webpage with the set text effect to the user.

In the present embodiment, the executing body may push the webpage with the set text effect to the user. Typically, the topic of the at least one webpage content segment is displayed first on the terminal device. When the user clicks on the topic of a webpage content segment, the webpage content segment in the webpage with the set text effect may be displayed. The text in the displayed webpage content segment that matches the topic of the webpage content segment is set to have the text effect, so that the user may notice the text with the set text effect in the first place when viewing the webpage content segment.

As can be seen from FIG. 4, the flow 400 of the method for pushing information in the present embodiment highlights the step of pushing information to the user as compared with the embodiment corresponding to FIG. 2. Thus, the solution described in the present embodiment hierarchically presents pushed information. The topic of at least one webpage content segment is first displayed. When the user clicks on the topic of the webpage content segment, the webpage content segment in the webpage with the set text effect is then displayed. Since the text in the displayed webpage content segment that matches the topic of the webpage content segment is set to have the text effect, so that the user may notice the text with the set text effect in the first place when browsing the webpage content segment again. The user can not only quickly acquire the core information of the webpage, but also acquire the core information of the webpage more comprehensively.

Figure 5:
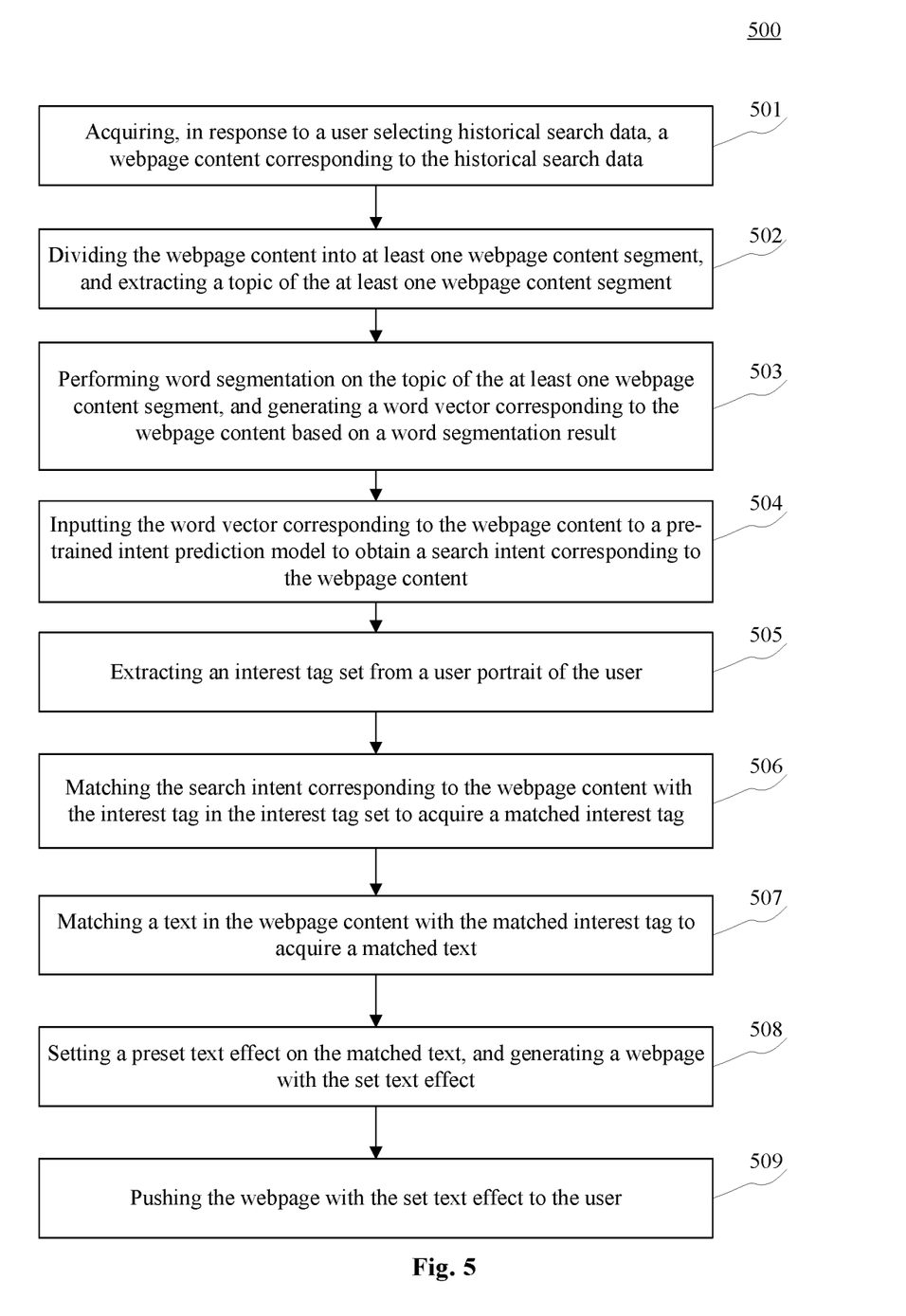
FIG. 5 is a flowchart of yet another embodiment of the method for pushing information according to the present disclosure.

With further reference to FIG. 5, a flow 500 of yet another embodiment of the method for pushing information according to the present disclosure is illustrated. The method for pushing information includes the following steps 501 to 504.

Step 501 includes acquiring, in response to a user selecting historical search data, a webpage content corresponding to the historical search data.

Step 502 includes dividing the webpage content into at least one webpage content segment, and extracting a topic of the at least one webpage content segment.

In the present embodiment, the specific operations of steps 501-502 are substantially the same as the operations of steps 201-202 in the embodiment shown in FIG. 2, and detailed description thereof will be omitted.

Step 503 includes performing word segmentation on the topic of the at least one webpage content segment, and generating a word vector corresponding to the webpage content based on a word segmentation result.

In the present embodiment, for each webpage content segment in the at least one webpage content segment, an executing body (for example, the server 105 as shown in FIG. 1) of the method for pushing information may first perform the word segmentation on the topic of the webpage content segment to obtain a keyword set of the topic of the webpage content segment; and then generate one dimension in the word vector based on the keyword set of the topic of the webpage content segment. Therefore, the number of dimensions of the word vector corresponding to the webpage content is the same as the number of webpage content segments into which the webpage content is divided.

Step 504 includes inputting the word vector corresponding to the webpage content to a pre-trained intent prediction model to obtain a search intent corresponding to the webpage content.

In the present embodiment, the executing body may input the word vector corresponding to the webpage content to the pre-trained intent prediction model, thereby outputting the search intent corresponding to the webpage content. The intent prediction model may be used to predict the search intent and characterize a corresponding relationship between the word vector and the search intent. The search intent may be used to express the search motivation of the user, that is, the information that the user really wants to acquire when the search is initiated.

In some alternative implementations of the present embodiment, the intent prediction model may be a corresponding relationship table storing a plurality of word vectors and corresponding search intents, the table being obtained by performing statistical analysis on a plurality of word vectors and corresponding search intents by those skilled in the art. As such, the executing body may calculate the similarity between the word vector corresponding to the webpage content and each word vector in the corresponding relationship table, and obtain a search intent corresponding to the webpage content from the corresponding relationship table based on a similarity calculation result. For example, first, the word vector with the highest similarity to the word vector corresponding to the webpage content is determined, and then the search intent corresponding to the word vector with the highest similarity to the word vector corresponding to the webpage content is found from the corresponding relationship table, and used as the search intent corresponding to the webpage content.

In some alternative implementations of the present embodiment, the intent prediction model may be obtained by supervised training of existing machine learning models (e.g., various artificial neural networks, etc.) using various machine learning methods and training samples. Here, the target detection model may be MLP (Multi-Layer Perceptron), which is obtained by training by the following steps:

First, a training sample set is acquired.

Here, the training sample may include sample search data and a sample search intent corresponding to the sample search data. The sample search data may include a sample search term and a topic of a sample webpage. Here, those skilled in the art may analyze the sample search data to obtain a sample search intent corresponding to the sample search data. For example, those skilled in the art may conduct a questionnaire survey on a large number of users who input sample search terms and browse sample webpages to obtain search intents of these users. Then, the search intents of these users are summarized to obtain the sample search intent.

Secondly, a multi-layer neural network is trained to obtain the intent prediction model based on the training sample set.

Here, for a training sample in the training sample set, the executing body may first perform word segmentation on the sample search data in the training sample, and generate a word vector corresponding to the sample search data based on a word segmentation result; and then train a multi-layer neural network using the word vector corresponding to the sample search data as an input, and the sample search intent corresponding to the sample search data as an output, to obtain the intent prediction model. The multi-layer neural network may be an untrained multi-layer neural network or the training for the multi-layer neural network is not finished. Here, for an untrained multi-layer neural network, its various parameters (e.g., weight parameters and offset parameters) are initialized using different small random numbers. The "small random number" is used to ensure that the network does not enter saturation due to excessive weight, which leads to training failure. "Different" is used to ensure that the network may learn normally. For a multi-layer neural network with unfinished training, each parameter therein may be an adjusted parameter. However, the prediction effect of the multi-layer neural network usually does not meet the pre-set constraints.

Step 505 includes extracting an interest tag set from a user portrait of the user.

In the present embodiment, the executing body may extract at least part of interest tags from a user portrait of the user to generate an interest tag set. For example, the executing body may arrange the interest tags in the user portrait of the user in a descending order of the weights, and select the pre-set number of interest tags of weights on top(for example, the top 10) to generate the interest tag set.

In practice, the user portrait may be user information including at least one category of descriptive tags established from pre-accumulated user data. Descriptive tags may be used to describe gender, age, marital status, occupation, income status, education level, interests, and the like, of the user. Here, a descriptive tag used to describe the user interest is the interest tag. Different interest tags may be set with different weights. Generally, the higher the user's interest in a certain thing, the greater the weight of the corresponding interest tag, and vice versa. For example, the user information contained in a user portrait may be "gender: male, age: 30-35 years old, marital status: married, occupation: bank staff, income status: greater than 8000, education level: university graduated, interests: sports, finance, science and technology." The interest tags of the user may include:

sports, finance, science and technology.

Step 506 includes matching the search intent corresponding to the webpage content with the interest tag in the interest tag set to acquire a matched interest tag.

In the present embodiment, the executing body may calculate the similarity between the search intent corresponding to the webpage content and each of the interest tags in the interest tag set, and determine the matched interest tag based on the similarity. For example, the interest tag with the highest similarity is used as the matched interest tag.

Step 507 includes matching a text in the webpage content with the matched interest tag to acquire a matched text.

In the present embodiments, for each webpage content segment in the at least one webpage content segment, the executing body may match the text in the webpage content with the matched interest tag to acquire the matched text. For example, the executing body may calculate the similarity between each sentence in the webpage content segment and the matched interest tag. If the similarity is greater than a preset similarity threshold, the text in the sentence is used as the matched text.

Step 508 includes setting a preset text effect on the matched text, and generating a webpage with the set text effect.

Step 509 includes pushing the webpage with the set text effect to the user.

In the present embodiment, the specific operations of steps 508-509 are substantially the same as the operations of steps 405-406 in the embodiment shown in FIG. 4, and detailed description thereof will be omitted.

As can be seen from FIG. 5, the flow 500 of the method for pushing information in the present embodiment highlights the step of pushing information to the user as compared with the embodiment corresponding to FIG. 2. Thus, the solution described in the present embodiment exhibits a webpage with the set text effect. Since the text in the webpage content that matches the matched interest tag is set to have the text effect, so that the user may notice the text with the set text effect in the first place when browsing the webpage content segment again. The user can not only quickly acquire the core information of the webpage, but also acquire the core information of the webpage more comprehensively.

Figure 6:
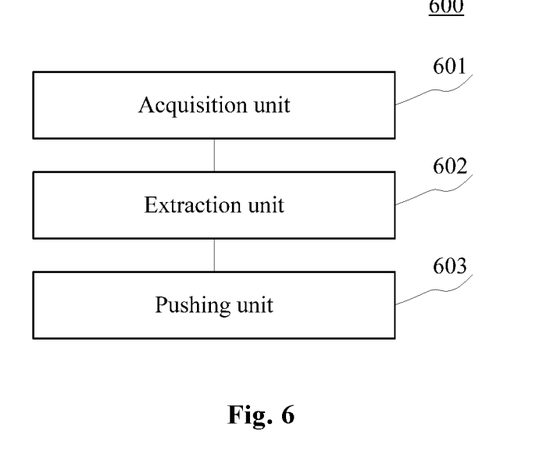
FIG. 6 is a schematic structural diagram of an embodiment of an apparatus for pushing information according to the present disclosure.

With further reference to FIG. 6, as an implementation of the method shown in the above figures, the present disclosure provides an embodiment of an apparatus for pushing information, and the apparatus embodiment corresponds to the method embodiment as shown in FIG. 2, and the apparatus may be specifically applied to various electronic devices.

As shown in FIG. 6, the apparatus 600 for pushing information of the present embodiment may include: an acquisition unit 601, an extraction unit 602 and a pushing unit 603. The acquisition unit 601 is configured to acquire, in response to a user selecting historical search data, a webpage content corresponding to the historical search data. The extraction unit 602 is configured to divide the webpage content into at least one webpage content segment, and extract a topic of the at least one webpage content segment. The pushing unit 603 is configured to push information to the user based on the topic of the at least one webpage content segment.

In the present embodiment, in the apparatus 600 for pushing information: the specific processing and the technical effects thereof of the acquisition unit 601, the extraction unit 602 and the pushing unit 603 may refer to the related descriptions of the steps 201, 202 and 203 in the corresponding embodiment of FIG. 2, respectively, and detailed descriptions thereof will be omitted.

In some alternative implementations of the present embodiment, the extraction unit 602 may be further configured to: input, for a webpage content segment in the at least one webpage content segment, the webpage content segment into a pre-trained document topic generation model to obtain the topic of the webpage content segment.

In some alternative implementations of the present embodiment, the pushing unit 603 may include: a first pushing subunit (not shown in the figure), configured to push the topic of the at least one webpage content segment to the user.

In some alternative implementations of the present embodiment, the pushing unit 603 may include: a first generation subunit (not shown in the figure), configured to match, for the webpage content segment in the at least one webpage content segment, a text in the webpage content segment with the topic of the webpage content segment to acquire a matched text, set a preset text effect on the matched text, and generate a webpage with the set text effect; and a second pushing subunit (not shown in the figure), configured to push the webpage with the set text effect to the user.

In some alternative implementations of the present embodiment, the pushing unit 603 may include: a word segmentation subunit (not shown in the figure), configured to perform word segmentation on the topic of the at least one webpage content segment, and generate a word vector corresponding to the webpage content based on a word segmentation result; a prediction subunit (not shown in the figure), configured to input the word vector corresponding to the webpage content to the pre-trained intent prediction model to obtain a search intent corresponding to the webpage content, where the intent prediction model is used to predict a search intent; an extraction subunit (not shown in the figure), configured to extract an interest tag set from a user portrait of the user; a matching subunit (not shown in the figure), configured to match the search intent corresponding to the webpage content with the interest tag in the interest tag set to acquire a matched interest tag; a second generation subunit (not shown in the figure), configured to match a text in the webpage content with the matched interest tag to acquire a matched text, set a preset text effect on the matched text, and generate a webpage with the set text effect; and a third pushing subunit (not shown in the figure), configured to push the webpage with the set text effect to the user.

In some alternative implementations of the present embodiment, the intent prediction model is obtained by training, the training including: acquiring a training sample set, where a training sample includes sample search data and a sample search intent corresponding to the sample search data; and training a multi-layer neural network to obtain the intent prediction model based on the training sample set.

Figure 7:
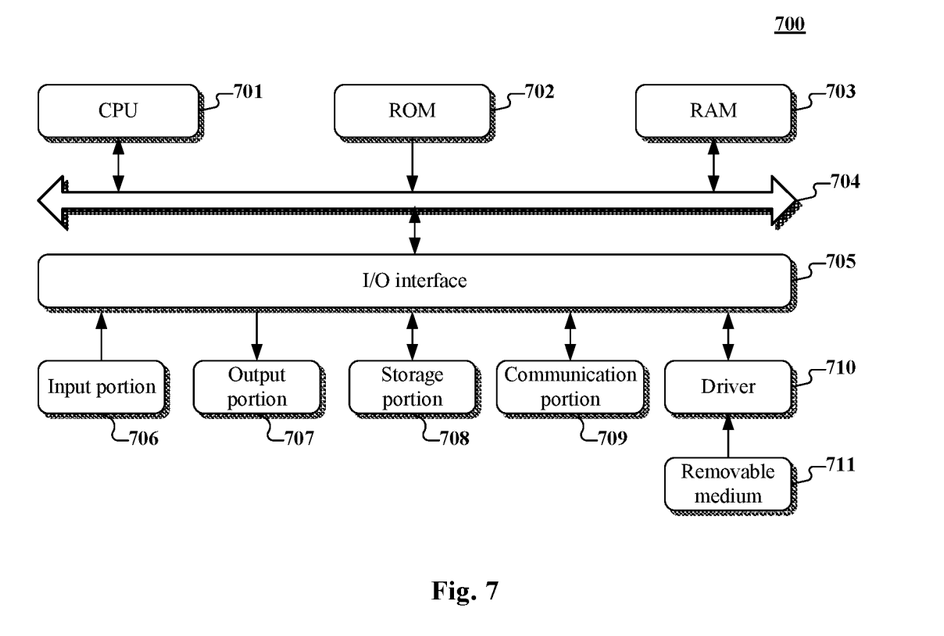
FIG. 7 is a schematic structural diagram of a computer system adapted to implement a server according to the embodiments of the present disclosure.

With further reference to FIG. 7, a schematic structural diagram of a computer system 700 adapted to implement a server (for example, the server 105 as shown in FIG. 1) of the embodiments of the present disclosure is shown. The server shown in FIG. 7 is merely an example, and should not impose any limitation on the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a cathode ray tube (CRT), a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the method of the present disclosure. It should be noted that the computer readable medium in the present disclosure may be computer readable signal medium or computer readable storage medium or any combination of the above two. An example of the computer readable medium may include, but not limited to: electric, magnetic, optical, electromagnetic, infrared, or semiconductor systems, apparatus, elements, or a combination of any of the above. A more specific example of the computer readable medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. Alternatively, the computer readable signal medium may be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, described as: a processor, including an acquisition unit, an extraction unit and a pushing unit. Here, the names of these units do not in some cases constitute a limitation to such units themselves. For example, the acquisition unit may also be described as "a unit for acquiring, in response to a user selecting historical search data, a webpage content corresponding to the historical search data."

In another aspect, the present disclosure further provides a computer readable medium. The computer readable medium may be included in the server in the above described embodiments, or a stand-alone computer readable medium not assembled into the server. The computer readable medium stores one or more programs. The one or more programs, when executed by the server, cause the server to: acquire, in response to a user selecting historical search data, a webpage content corresponding to the historical search data; divide the webpage content into at least one webpage content segment, and extract a topic of the at least one webpage content segment; and push information to the user based on the topic of the at least one webpage content segment.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for pushing information, the method comprising:
acquiring, in response to a user selecting historical search data, a webpage content corresponding to the historical search data;
dividing the webpage content into at least one webpage content segment, and extracting a topic of the at least one webpage content segment; and pushing information to the user based on the topic of the at least one webpage content segment, wherein the pushing information to the user based on the topic of the at least one webpage content segment comprises:
  determining a search intent corresponding to the webpage content based on the topic of the at least one webpage content segment, wherein determining the search intent corresponding to the webpage content based on the topic of the at least one webpage content segment comprises;
    performing word segmentation on the topic of the at least one webpage content segment, and generating a word vector corresponding to the webpage content based on a result of the word segmentation; and
    inputting the word vector corresponding to the webpage content to a pre-trained intent prediction model to obtain the search intent corresponding to the webpage content, wherein the intent prediction model is used to predict and output the search intent;
  extracting an interest tag set from a user portrait of the user;
  matching the search intent corresponding to the webpage content with an interest tag in the interest tag set to acquire a matched interest tag;
  matching a text in the webpage content with the matched interest tag to acquire a matched text, setting a preset text effect on the matched text, and generating a webpage with the preset text effect; and
  pushing the webpage with the preset text effect to the user.

2. The method according to claim 1, wherein the extracting the topic of the at least one webpage content segment comprises:
  inputting, for a webpage content segment in the at least one webpage content segment, the webpage content segment into a pre-trained document topic generation model to obtain the topic of the at least one webpage content segment.

3. The method according to claim 1, wherein the pushing information to the user based on the topic of the at least one webpage content segment comprises:
  pushing the topic of the at least one webpage content segment to the user.

4. The method according to claim 1, wherein the pushing information to the user based on the topic of the at least one webpage content segment comprises:
  matching, for a webpage content segment in the at least one webpage content segment, a text in the webpage content segment with the topic of the at least one webpage content segment to acquire the matched text, setting the preset text effect on the matched text, and generating the webpage with the preset text effect; and
  pushing the webpage with the preset text effect to the user.

5. The method according to claim 1, wherein the intent prediction model is obtained by training, the training including:
  acquiring a training sample set, wherein the training sample set comprises sample search data and a sample search intent corresponding to the sample search data; and
  training a multi-layer neural network to obtain the intent prediction model based on the training sample set.

6. The method according to claim 1, the method comprising:
  detecting a click on a button in an application; and
  simultaneously displaying a plurality of topics and a plurality of search queries in the historical search data on a given interface, in response to detecting the click on the button, wherein the plurality of topics and the plurality of search queries are generated within a given period.

7. An apparatus for pushing information, the apparatus comprising:
  at least one processor; and
  a memory storing instructions, the instructions when executed by the at least one processor, causing the at least one processor to perform operations, the operations comprising:
    acquiring, in response to a user selecting historical search data, a webpage content corresponding to the historical search data;
    dividing the webpage content into at least one webpage content segment, and extracting a topic of the at least one webpage content segment; and
    pushing information to the user based on the topic of the at least one webpage content segment, wherein the pushing information to the user based on the topic of the at least one webpage content segment comprises:
      determining a search intent corresponding to the webpage content based on the topic of the at least one webpage content segment, wherein determining the search intent corresponding to the webpage contact based on the topic of the at least one webpage content segment comprises:
        performing word segmentation on the topic of the at least one webpage content segment, and generating a word vector corresponding to the webpage content based on a result of the word segmentation; and
        inputting the word vector corresponding to the webpage content to a pre-trained intent prediction model to obtain the search intent corresponding to the webpage content, wherein the intent prediction model is used to predict and output the search intent;
      extracting an interest tag set from a user portrait of the user;
      matching the search intent corresponding to the webpage content with an interest tag in the interest tag set to acquire a matched interest tag;
      matching a text in the webpage content with the matched interest tag to acquire a matched text, setting a preset text effect on the matched text, and generating a webpage with the preset text effect; and
      pushing the webpage with the preset text effect to the user.

8. The apparatus according to claim 7, wherein the extracting the topic of the at least one webpage content segment comprises:
  inputting, for a webpage content segment in the at least one webpage content segment, the webpage content segment into a pre-trained document topic generation model to obtain the topic of the at least one webpage content segment.

9. The apparatus according to claim 7, wherein the pushing information to the user based on the topic of the at least one webpage content segment comprises:
  pushing the topic of the at least one webpage content segment to the user.

10. The apparatus according to claim 7, wherein the pushing information to the user based on the topic of the at least one webpage content segment comprises:

matching, for a webpage content segment hi the at least one webpage content segment, a text in the webpage content segment with the topic of the at least one webpage content segment to acquire the matched text, setting the preset text effect on the matched text, and generating the webpage with the preset text effect; and pushing the webpage with the preset text effect to the user.

11. The apparatus according to claim 7, wherein the intent prediction model is obtained by training, the training including:

acquiring a training sample set, wherein the training sample set comprises sample search data and a sample search intent corresponding to the sample search data; and training a multi-layer neural network to obtain the intent prediction model based on the training sample set.

12. A non-transitory computer readable medium, storing a computer program thereon, wherein the program, when executed by a processor, causes the processor to perform operations, the operations comprising:

acquiring, in response to a user selecting historical search data, a webpage content corresponding to the historical search data;

dividing the webpage content into at least one webpage content segment, and extracting a topic of the at least one webpage content segment; and pushing information to the user based on the topic of the at least one webpage content segment, wherein the pushing information to the user based on the topic of the at least one webpage content segment comprises:

determining a search intent corresponding to the webpage content based on the topic of the at least one webpage content segment, wherein determining the search intent corresponding to the webpage content based on the topic of the at least one webpage content segment comprises;

performing word segmentation on the topic of the at least one webpage content segment, and generating a word vector corresponding to the webpage content based on a result of the word segmentation; and inputting the word vector corresponding to the webpage content to a pre-trained intent prediction model to obtain the search intent corresponding to the webpage content, wherein the intent prediction model is used to predict and output the search intent;

extracting an interest tag set from a user portrait of the user;

matching the search intent corresponding to the webpage content with an interest tag in the interest tag set to acquire a matched interest tag;

matching a text in the webpage content with the matched interest tag to acquire a matched text, setting a preset text effect on the matched text, and generating a warpage with the preset text effect; and pushing the webpage with the preset text effect to the user.

* * * * *

UNITED STATES PATENT AND TRADEMARK OFFICE
CERTIFICATE OF CORRECTION

PATENT NO. : 11,172,040 B2  
APPLICATION NO. : 16/433290  
DATED : November 9, 2021  
INVENTOR(S) : Zhang Page 1 of 1

It is certified that error appears in the above-identified patent and that said Letters Patent is hereby corrected as shown below:

In the Claims

In Column 16, Line 30, Claim 7, delete "contact" and insert --content--.

In Column 17, Line 4, Claim 10, delete "hi" and insert --in--.

In Column 18, Line 8, Claim 12, delete "comprises;" and insert --comprises:--.

In Column 18, Line 28, Claim 12, delete "warpage" and insert --webpage--.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*